(12) United States Patent
Luzader

(10) Patent No.: US 11,785,464 B2
(45) Date of Patent: *Oct. 10, 2023

(54) MEDIA AGNOSTIC CONTENT ACCESS MANAGEMENT

(71) Applicant: Blink.Cloud LLC, Lorton, VA (US)

(72) Inventor: Jonathan S. Luzader, Lorton, VA (US)

(73) Assignee: THE PRIVATE SECTOR GROUP, LLC., Lorton, VA (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/157,673

(22) Filed: Jan. 25, 2021

(65) Prior Publication Data
US 2021/0204132 A1 Jul. 1, 2021

Related U.S. Application Data

(60) Continuation of application No. 16/044,306, filed on Jul. 24, 2018, now Pat. No. 10,904,761, which is a
(Continued)

(51) Int. Cl.
| | |
|---|---|
| G06F 16/951 | (2019.01) |
| G06F 21/10 | (2013.01) |
| H04L 67/02 | (2022.01) |
| H04L 67/53 | (2022.01) |
| H04W 12/08 | (2021.01) |
| H04L 9/40 | (2022.01) |

(Continued)

(52) U.S. Cl.
CPC ......... *H04W 12/08* (2013.01); *G06F 16/951* (2019.01); *G06F 21/10* (2013.01); *H04L 63/0428* (2013.01); *H04L 63/06* (2013.01); *H04L 63/0876* (2013.01); *H04L 63/10* (2013.01); *H04L 67/146* (2013.01); *H04L 67/02* (2013.01); *H04L 67/306* (2013.01); *H04L 67/53* (2022.05)

(58) Field of Classification Search
None
See application file for complete search history.

(56) References Cited

U.S. PATENT DOCUMENTS

| | | | |
|---|---|---|---|
| 6,253,204 B1 * | 6/2001 | Glass | .................. G06F 16/9566 |
| | | | 707/E17.115 |
| 6,856,989 B1 | 2/2005 | Zhou et al. | |

(Continued)

OTHER PUBLICATIONS

Notice of Allowance issued in U.S. Appl. No. 15/256,356, dated Dec. 30, 2016.
(Continued)

*Primary Examiner* — Uyen T Le
(74) *Attorney, Agent, or Firm* — Hogan Lovells US LLP

(57) ABSTRACT

A communication method and system according to the present invention generates a unique cryptographically secure URI in response to receiving a user post. The user post and URI are stored temporarily. The URI is sent to an intended recipient. In response to a first instance of accessing the URI, the content is retrieved and sent to the intended recipient. The original uploaded content and URI are then deleted. In response to subsequent instances of accessing the URI, random content determined in part by a current environmental state of the communication, is returned. Recent subsequent instances can return thematically similar content.

20 Claims, 12 Drawing Sheets

Related U.S. Application Data division of application No. 15/462,594, filed on Mar. 17, 2017, now Pat. No. 10,033,741, which is a continuation of application No. 15/256,356, filed on Sep. 2, 2016, now Pat. No. 9,635,027.

(51) Int. Cl.
*H04L 67/146* (2022.01)
*H04L 67/306* (2022.01)

(56) References Cited

U.S. PATENT DOCUMENTS

| | | | |
|---|---|---|---|
| 8,117,082 | B1 | 2/2012 | Brandwine |
| 8,127,220 | B1 | 2/2012 | Dean et al. |
| 8,607,358 | B1 | 12/2013 | Shankar et al. |
| 8,938,547 | B1 | 1/2015 | Roberge et al. |
| 9,002,819 | B2 | 4/2015 | Brawer |
| 9,075,885 | B2 * | 7/2015 | Walker ............ G06F 16/9566 |
| 9,166,890 | B2 | 10/2015 | Maytal |
| 9,635,027 | B1 | 4/2017 | Luzader |
| 9,712,411 | B2 | 7/2017 | Tseitlin |
| 10,033,741 | B2 | 7/2018 | Luzader |
| 10,394,939 | B2 * | 8/2019 | Watanabe ............ G06F 40/197 |
| 2002/0052889 | A1 * | 5/2002 | Shinoda ............ G06F 16/958 |
| | | | 715/255 |
| 2002/0107942 | A1 | 8/2002 | Thomas |
| 2003/0101231 | A1 * | 5/2003 | Kausik ............ H04L 67/5682 |
| | | | 709/225 |
| 2004/0205569 | A1 * | 10/2004 | McCarty ............ G06F 16/9566 |
| | | | 707/E17.115 |
| 2007/0043872 | A1 | 2/2007 | Pattan et al. |
| 2007/0104326 | A1 | 5/2007 | Feigenbaum et al. |
| 2007/0192673 | A1 | 8/2007 | Bodin |
| 2010/0131588 | A1 * | 5/2010 | Loftus ............ G06F 16/957 |
| | | | 709/203 |
| 2012/0147888 | A1 * | 6/2012 | Lu ............ H04L 45/54 |
| | | | 370/392 |
| 2012/0331108 | A1 | 12/2012 | Ferdowsi et al. |
| 2013/0055100 | A1 * | 2/2013 | Kondasani ......... G06F 16/9566 |
| | | | 715/739 |
| 2014/0052790 | A1 | 2/2014 | Yuen |
| 2014/0223574 | A1 | 8/2014 | Margalit et al. |
| 2015/0177954 | A1 * | 6/2015 | Wei ............ G06F 3/0482 |
| | | | 715/738 |

OTHER PUBLICATIONS

International Search Report issued in International Application No. PCT/US2017/049168, dated Nov. 6, 2017.
Restriction Requirement issued in U.S. Appl. No. 15/462,594, dated Jun. 29, 2017.
Non-Final Rejection issued in U.S. Appl. No. 15/462,594, dated Oct. 19, 2017.
Notice of Allowance issued in U.S. Appl. No. 15/462,594, dated Apr. 2, 2018.
Notice of Allowance issued in U.S. Appl. No. 15/462,594, dated Apr. 19, 2018.
Restriction Requirement issued in U.S. Appl. No. 16/044,306, dated Oct. 15, 2019.
Non-Final Office Action issued in U.S. Appl. No. 16/044,306, dated Jan. 24, 2020.
Final Office Action issued in U.S. Appl. No. 16/044,306, dated Jul. 9, 2020.
Notice of Allowance issued in U.S. Appl. No. 16/044,306, dated Sep. 30, 2020.

* cited by examiner

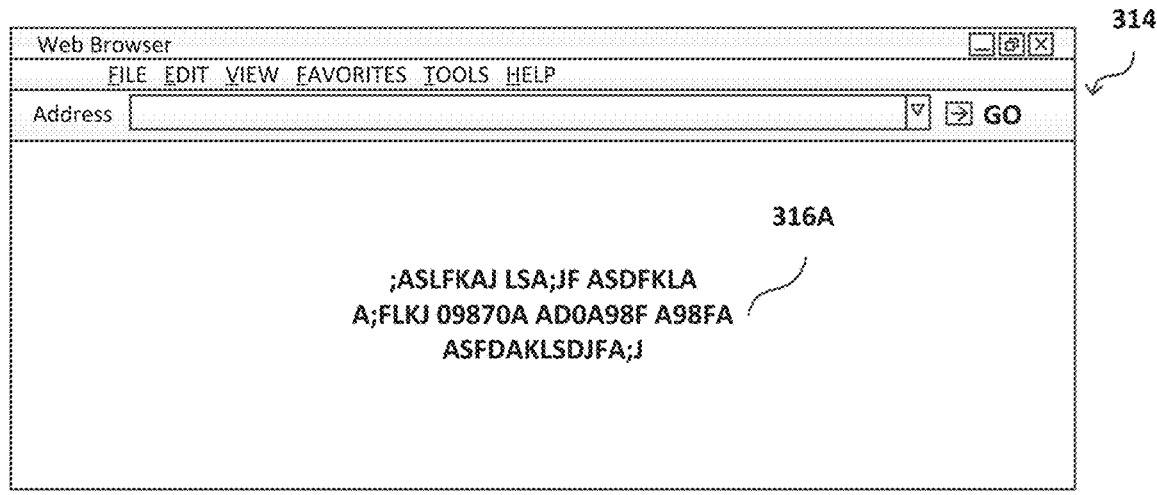
FIG. 3I
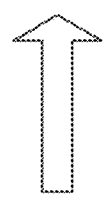
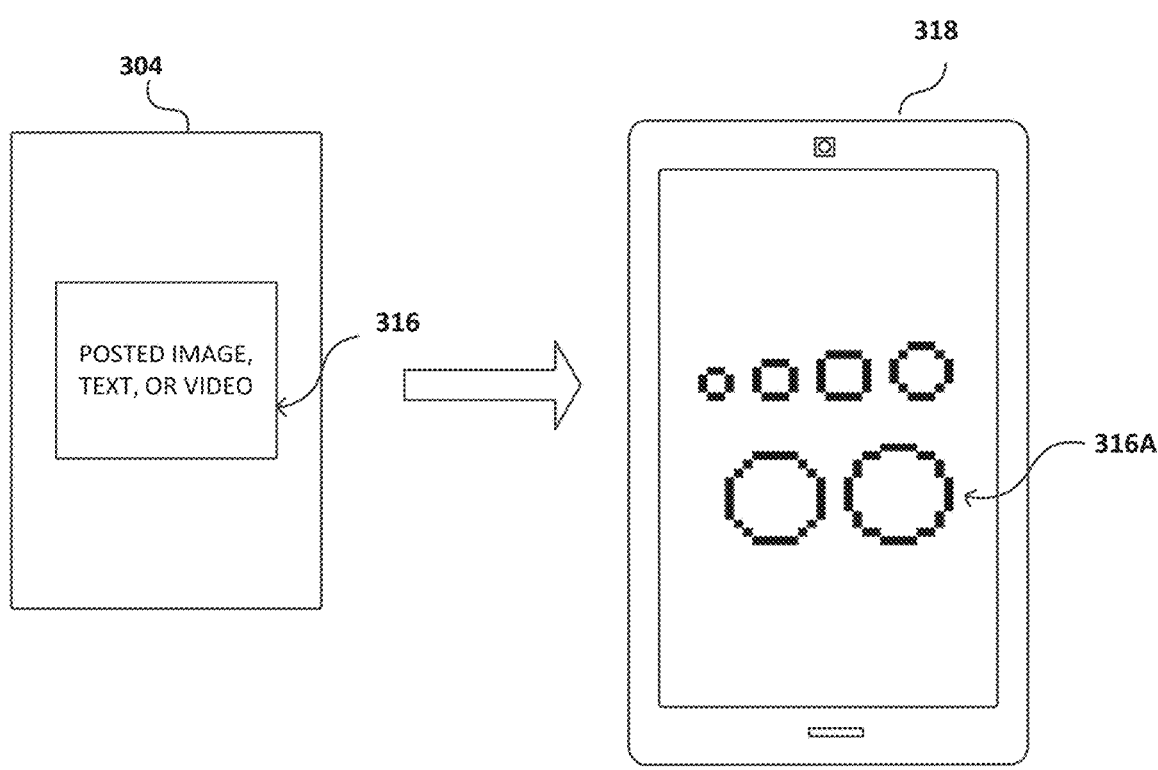
FIG. 3J
FIG. 3K

MEDIA AGNOSTIC CONTENT ACCESS MANAGEMENT

RELATED APPLICATIONS

The present application is a continuation of allowed U.S. patent application Ser. No. 16/044,306, filed Jul. 24, 2018, which is a divisional of patented U.S. patent application Ser. No. 15/462,594, filed Mar. 17, 2017, now U.S. Pat. No. 10,033,741, which is a continuation of and claims the benefit of priority to U.S. patent application Ser. No. 15/256,356, filed Sep. 2, 2016, now U.S. Pat. No. 9,635,027, all of which are hereby incorporated by references in their entirety for all purposes as if fully set forth herein.

BACKGROUND

Information technology has grown to be a part of millions of people's lives and the reliance on encrypted systems for communicating private data, confidential information, financial transactions, and digital media have become vitally important to society. Over the last few years, the world has seen some of the worst information security breaches of all time. The focus of the information security industry over the last few decades has been centered on public/private key cryptography and the ability to combat an attacker's attempt to compromise a message or system via "brute force" methods. These industry standard methods for securing messages and message contents have proven to be insufficient in protecting data from compromise and surveillance.

It is thus desirable to provide a secure communication method that achieves reasonable levels of security by means other than public/private key cryptography and is resistant to compromise using "brute force" methods.

BRIEF DESCRIPTION OF THE DRAWINGS

Various embodiments in accordance with the present disclosure will be described with reference to the drawings, in which:

FIGS. 3A-3K illustrate example environments in which an unintended recipient accesses a URI according to the method of the present invention;

DETAILED DESCRIPTION

Figure 1A:
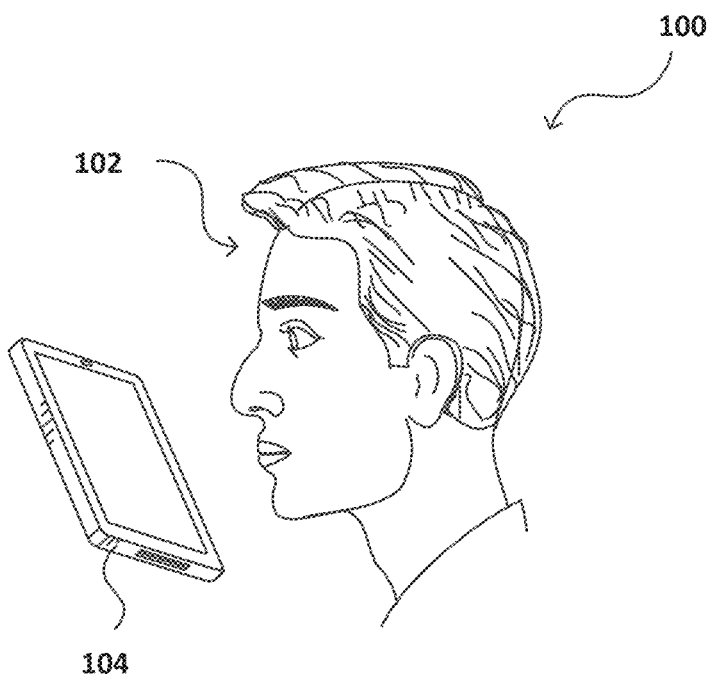
FIGS. 1A-1C illustrate an example environment in which a message can be uploaded and received according to the method of the present invention.

The embodiments of the present invention described herein relate to the fields of information security and allow two parties to communicate and exchange data securely and openly between themselves with built-in mechanisms for detection of message interception as well as assurance that messages or transactions are not stored indefinitely after being viewed. The communication method of the present invention is different from encryption-based security methods and by extension accepts the following premises:

That time dictates the security and privacy of encrypted data—given enough time, encrypted data can and will be decrypted and compromised;

The data that is being decrypted in a general attack is known to the attackers to be of value;

That compromised systems further lead to additional compromised systems, using information gained through comprise of the first system (e.g., federated logins, shared or similar passwords, user account information, message contents stored in plain text, unencrypted files or folders, etc.; and The average time to comprise a message is a standard value based on the level of entropy of the resource generated, average length of time a particular file or message exists within a system, active use of individual resources within the set of all possible resources, and the number of resources that can be evaluated in a given period of time.

Given the above premises, a system that returns the contents of all combinations of unique resources within the set of all possible resources, on-demand, and provides users the ability to momentarily define the contents of a resource and share a single exposure of said resource through an external channel to an intended recipient, provides a sufficiently deterrent method to a variety of surveillance and eavesdropping techniques as well as large scale cyber attacks, including but not limited to Distributed Denial of Service (DDOS), State Extension, and Man in the Middle attacks as well as prevents compromise of sensitive data in separate information technology systems that were encapsulated by the invention using the methods described below.

An embodiment of the present invention comprises generating a publicly accessible resource, which is a Uniform Resource Identifier (URI) hyperlink. As is known in the art, other such resources can be used such as a Uniform Resource Locator (URL). Accordingly, to an embodiment of the invention, no authentication is required, and the method of the present invention returns uploaded content to a requestor upon the first instance of the URI hyperlink selection. The returned content can be momentarily edited and stored at a randomly generated URI. The next actor to request the unique resource's contents by identifier will receive randomly generated content and, by design, cause the original uploaded contents to be destroyed after the contents are queried by the system and returned. This allows the two parties to communicate openly with assurance that the sender's message was not observed before the intended receiver had a chance to view it. If a third-party did manage to view the message before the intended viewer, the intended viewer would be exposed to dynamically generated message contents that would serve as an indication that the original message was compromised. According to an embodiment of the present invention, if the transaction history of the message were to be compromised in a third-party system, such as an email system, the URI that was used for the original message would still be an active URI (as the resources are all persistent), however only dynamically rendered content would be returned, as the original message has already been viewed by the intended recipient and hence has been destroyed. The method of the present invention allows actors to encapsulate secure portions of their messages or the entire message and allows them to share a unique URI link to that message for future viewing by an intended recipient. In comparison to traditional encryption methods, the unique resource identifier generated according to the present invention corresponds to a successful "key" to the message, known only to the actor who originally generated the key. This key and its message persist throughout time until it is requested to be viewed or a specific time limit determined by the system is reached or the existence of the message is ultimately determined by the system. This successful key and its contents exist within the space of all possible keys, and by extension of the methods used to generate random content within the system, all possible messages given the environmental constraints of the system, including the maximum length of the URI possible, maximum number of symbols possible for each character in the sequence, and the overall computational capabilities of the system.

According to the communication method of the present invention, attackers can openly attempt to mount a brute force attack, as they and the rest of the public, given access to the Internet, can request content for all possible combinations of the URI. Each subsequent attempt to access a resource, after an initial successful access, is met with a random content response, which is either configured by a human user or a third party machine, or generated by the invention using dynamic content generation techniques described in further detail below. According to the present invention, the system generates a substantial amount of noise that makes any attempts at surveillance, indexing, tracking, or eavesdropping arduous, computationally expensive and impractical.

FIG. 1A illustrates, an example environment 100 including, for example, a user 102 of the communication method according to the present invention uploading a message on a user interface on a client device 104. Although a portable computing device 104 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

In this example, the user 102 can upload the content and share a link that, when selected, can display the content on a recipient's computing device. For example, according to the communication method of the present invention, the user 102 firstly decides to send content to an intended recipient. The content can be, for example, a text message, an image, or a video. Content can also include audio, animation, interactive content, rich media content, or any other form of information. The content is uploaded to the communication service typically via the internet according to the present invention. Uploading content can be accomplished by, for example, sending the content to the communication service via email, using a network browser via a portable computing device, using an "app" received from the communication service, or any other known uploading techniques. Once the content is received by the communication service a link is returned from the communication service to the sender. The link is in the form of a secure URI (Uniform Resource Identifier) or other form of link. This link, and not the original uploaded content itself, can be shared with an intended recipient via any of the above techniques such as in an email, text message, or using a browser on a portable or other computing device.

In accordance with various embodiments, the user 102 (sender or recipient) may have an account with the communication service, or may be an unauthenticated user. If the user 102 has an account with the communication service, the user will have special privileges with the communication service as will be described in further detail below. Receiving the link will be described below from the viewpoint of the recipient of the link. FIG. 1A also serves to illustrate an intended recipient 102 of the uploaded message viewing the message on the client device 104, which happens in two steps. Once the intended recipient 102 receives a shared link, the shared link can then be selected at any subsequent time and viewed, unless, in some embodiments, a predetermined time limit has been reached and the originally uploaded content has been destroyed. Once the link is selected, an indication is sent to the communication service via the client device 104. The link or other selectable element, when selected, can enable the computing device to launch a web browser, navigate to a particular web site, launch an application, or perform some other function and the launched application can be then used to view the content associated with the link.

Figures 1B, 1C:
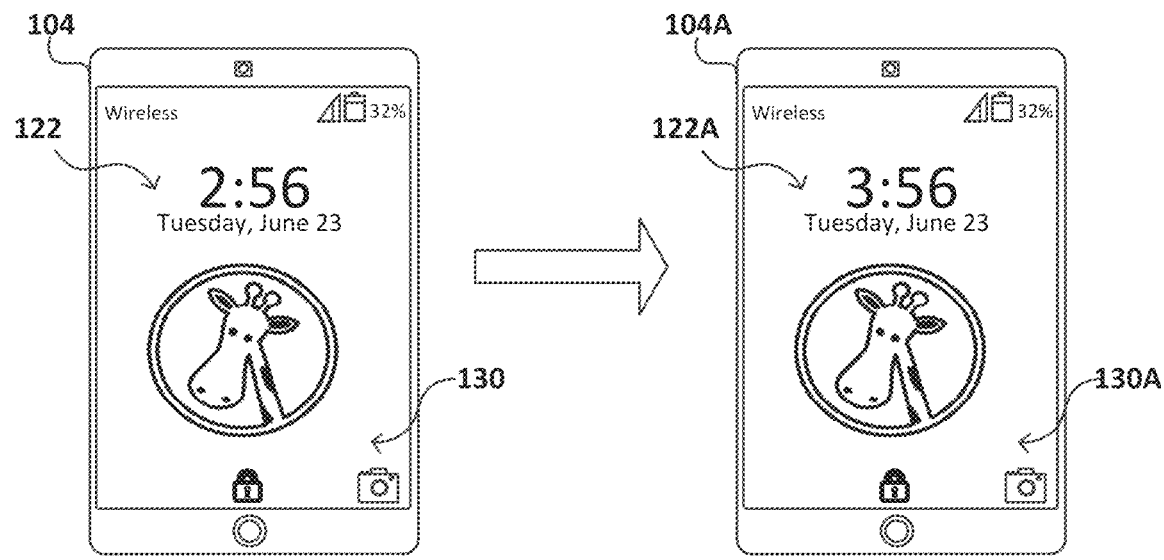

As will be discussed in further detail below, the communication service according to the present invention determines whether or not the URI associated with the selected link actually exists in a corresponding database. If the URI exists, then the originally uploaded content is sent to the recipient's user device 104, and the originally uploaded content can be conventionally viewed. At the same time, the URI and content is deleted in the communication service database as is explained in further detail below. The uploading of the image by a first user and the viewing of the same image by a subsequent intended recipient is shown with respect to FIG. 1B. As shown in FIG. 1B, image 130 is uploaded on a sender's client device 104 at a first time 122. A generated URI that is paired with the image 130 is sent to a receiver's client device 104A. Once the URI is selected, at a second time 122A, the receiver can view the same uploaded image 130A on user device 104. If the URI does not exist, however, this is indicative that the intended recipient has already viewed the URI and associated content, and thus a second or subsequent unintended recipient is requesting access to the link. If an unintended recipient requests access to the link then random content is returned as is also explained in further detail below.

Figure 2:
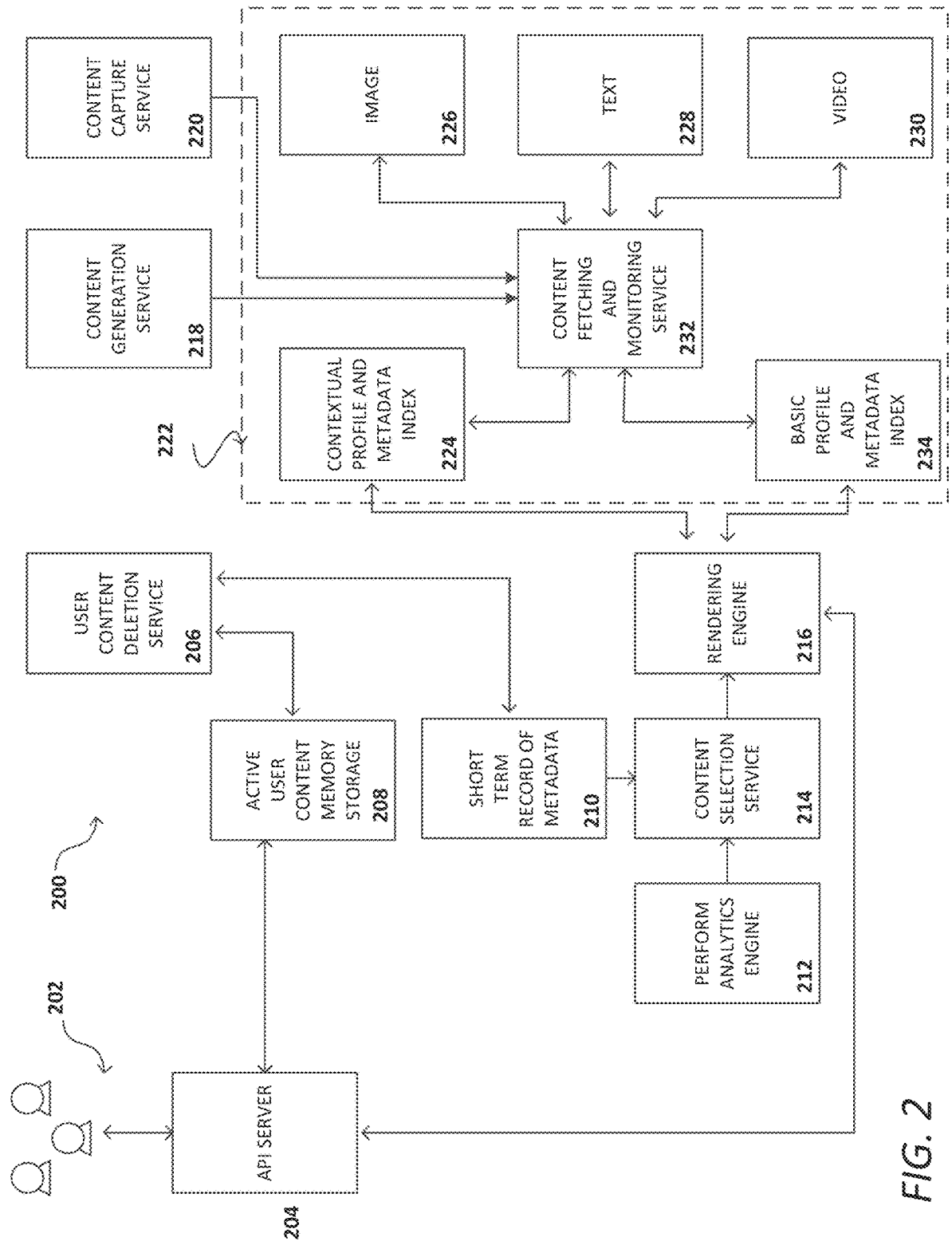
FIG. 2 illustrates a block diagram of a communication system in which aspects of the various embodiments can be implemented.

FIG. 2 illustrates the communication system and dynamic content rendering engine 200 according to the present invention. The rendering engine 200 contains all of the memory and other hardware or software components necessary to provide all of the uploading, sharing, retrieving, storage, monitoring, and other functions associated with the communication service of the present invention.

Users 202 (including authenticated and unauthenticated actors) interact with the communication system 200 through an application programming interface ("API") server 204. While any unauthenticated user may use the communication system 200 and method of the present invention, authenticated or registered users establish an account with the communication service 200 and are given special privileges. For example, an authenticated or registered user 202 may be allowed to include special keywords and tasks or other actions associated with a posting of content. The registered user can be associated with a customer account which can include one or more profiles, e.g., one or more family member profiles, business profiles, or other profiles, where each profile can be associated with a telephone number, preferences, access rights, and other information, and may share certain account settings as may include payment information (same credit card), address, message allotment, etc. In one particular example, an authenticated user 202 may be a company conducting an advertising campaign wherein a prize is associated with the viewing of a particular posting. The data that is not directly associated with a posting can be associated with a user profile as is described in further detail below. The users 202 can either post content or receive a response through an interface that is provided by communication system 200. The API server 204 includes a delay filter for delaying submissions. In one embodiment, delays of submissions and returns are monitored and determined so that detection of user submitted content cannot be successfully achieved through monitoring the average return time of responses, e.g., the difference between pulling user content from a database as opposed to generating content and returning it. If these times were drastically different, it would be simple to detect at scale. The API server 204 also receives logging and tracking metrics that monitor the environmental states (entropy) of the system in real time. Logging and tracking metrics can include the numbers of posts to the system, the number of posts that are being received by users, the number of active sessions between a user and receiver of content, the bandwidth usage of users submitting content, nature of IP addresses used to submit content, memory usage of the system 200, number of processor cycles being used by the system 200, state of a running entropy model of the system, and average file exposure time or time until submitted content is viewed. The average file exposure time is the average length of time a file message is posted until it is viewed. This is calculated metadata that is stored in a separate table and is not deleted. The API server also receives data from the rendering engine 216 as is described in further detail below.

The logging and tracking metrics are not limited by the specific examples listed above. Other such metrics known to those skilled in the art can be used. Each metric can be weighted and normalized, or combined in any mathematical fashion desired. An aggregate score for a number of monitored metrics can be compared to an environmental activity threshold.

Once content is posted via the API server 204, the system determines whether or not the post includes contextual information. Contextual information can include, for example, a list of keywords, commands entered by the user, purpose of the post, or any other associated information that is separate from the message of the post. If contextual information is present, the metadata and contextual data are extracted from the message. Metadata can be any information about the file, content, or message being uploaded. For instance, file size, file type, message length, language, time of submission, etc. Other such metadata known to those skilled in the art can be used. If contextual information is not present, then only the metadata is extracted from the post. In either case, a profile is then built and a cryptographically secure URI is generated and sent back to the API server 204. The URI is generated with an algorithm that includes a minimum length character string that has an acceptable level of entropy. Typically, the generated URI is lengthy. An example of multiple different URI's are given below:

Example 1: aXt0-2ki-989Rrt4-2x

Example 2: xh21lp

Example 3: 2j3kl459dxAEOikvVv32jf2j4mdnd8b49D jC CnvVn22424498Ddj1j2h3vVvwQwqW

At the same time, the post and metadata and contextual profile is saved in the active user content memory storage location 208. The length and complexity of the URI is only limited by the constraints of the software and hardware systems of the platform or technology in which the URI is used.

Once the URI is received and selected by a receiving user, the system 200 determines if the URI exists, by, for example, interrogating an index of a database. In the system 200 of the present invention a single database, or multiple databases and indices may be used. It may be more convenient to store content by content type in various specific databases. If the URI does exist, the previously stored content is retrieved and returned to the API server 204. If the URI does not exist, the system 200 determines whether or not the user content has recently existed. If the user content has recently existed, then the metadata and contextual profile is pulled from the short term record of metadata memory location 210 and sent to the content selection service 214. If the user content has not recently existed, then this information is also communicated to the content selection service 214. The content selection service 214 also receives information from a performance analytics engine 212. The performance analytics engine 212 monitors the environmental logging and tracking metrics previously described.

The output of the content selection service 214 is sent to a rendering engine 216. The rendering engine combines information from the performance analytics of the system and contextual and profile metadata.

The output of the rendering engine 216 is in communication with a querying index that determines whether or not metadata and contextual profile exists for a previously submitted resource. If a profile exists, then the querying index searches a contextual profile and metadata index 224 that is stored in a persistent storage location 222.

If a profile does not exist, the system of the present invention calculates a system preference based on live data from the performance analytics engine 212 and builds a basic profile. This situation would occur if there were no previously submitted data for a given resource, as well as activity where malign actors are continuously demanding access to a given resource. A basic profile and metadata index 234 is then built and is in communication with the content fetching and monitoring service 232 as before. An example of a basic profile that would be created in this situation would be similar to: data type: text, minimum length: "n" characters, content type: random. This would inform the system to generate random strings of "n" length and return to the user. The monitoring service 232 acts as a through put monitor and garbage collector for content that is used multiple times.

The contextual profile and metadata index 224 is in communication with a content fetching and monitoring service 232 that is, in turn, in communication with persistence image 226, text 228, or video 230 storage locations. These memory locations store the random content that is retrieved for subsequent selections of the URI as previously described. Other storage locations can also be used as required. For one example, audio and large file storage locations can also be used in addition to the image, text, and video storage locations.

A content generation service 218 is used to generate content including randomization of text, generation of images or gifs, generation of fake or dummy messages, as well as low fidelity information that can be returned when the system 200 is under stress. The information generated by the content generation service 218 is classified for a contextual profile and metadata comparison, and returned to the content fetching and monitoring service 232.

A content capture service 220 is used to obtain data through, for example, the Internet. The content capture service 220 includes methods for crawling the World Wide Web, obtaining access to public and free APIs, advertisements, and other sources of content.

System 200 also includes a user content deletion service 206, that deletes both the user posted content and the associated URI, as well as metadata associated with the post. The user content deletion service 206 is a service that is triggered by the act of executing a select statement on a database record. The user content deletion service 206 also can delete posted content and the associated URI based on expiration of a predetermined time period as well as other means determined by the system. The content deletion service 206 is thus in communication with both the active user content memory storage location 208 and the short term record of metadata memory location 210.

In accordance with various embodiments, the rendering engine 200 of the present invention may be performed by any number of server computing devices, desktop computing devices, mainframe computers, and other hardware, firmware, or software, or virtual machines. Each individual device may implement one or more of the components of the rendering engine 216. For example, rendering engine 216 can include various modules and components combined on a single device, or multiple instances of a single module or component. In some embodiments, the features and services provided by rendering engine 216 can be implemented as web services consumable via a communication network. In other embodiments, the rendering engine 216 is provided by one or more virtual machines implemented in a hosted computing environment (which can be seen, for example, in FIGS. 6A-6C). A hosted computing environment can include one or more rapidly provisioned and released computing resources, which computing resources may include computing, networking and/or storage devices. The hosted computing environment may also be referred to as a cloud computing environment. Aspects of the rendering engine 216 may be absorbed into and performed by the user portable devices 104.

FIGS. 3A through 3K are provided to illustrate the case where a shared link is viewed by an unintended recipient. This is the case where the intended recipient has already made a first link selection and has already received the intended content, and the content and its associated URI has been deleted in the database of the communication service. The unintended recipient has possibly surreptitiously gained access to the original URI and seeks to gain access to the content associated with the URI. In this case, instead of returning an error message or the like, similar but random content is returned at least in part determined by the environmental state of the communication system of the present invention. FIGS. 3A through 3K illustrate in pairs, the original uploaded content, and secondly the random content received by a recipient once the link has been selected. The link in the unintended case is not intentionally "shared" but merely "obtained" by the unintended recipient.

Figure 3A:
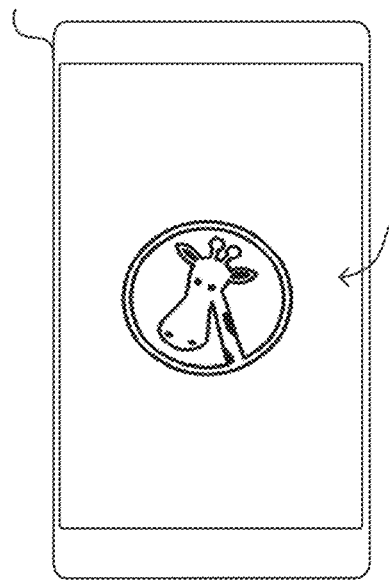
Figure 3B:
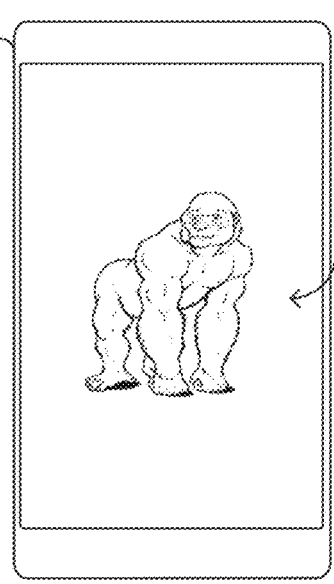

FIG. 3A illustrates a sender's client device 304, that has uploaded an image 306 to send to a receiver client device 304A in FIG. 3B. If the receiver is unintended, and is making a second or subsequent selection of the original URI that was paired with image 306, system 200 will determine that the original URI no longer exists, and will in turn return a random image 306A consistent with a determination of the current environmental state of the system.

Figure 3C:
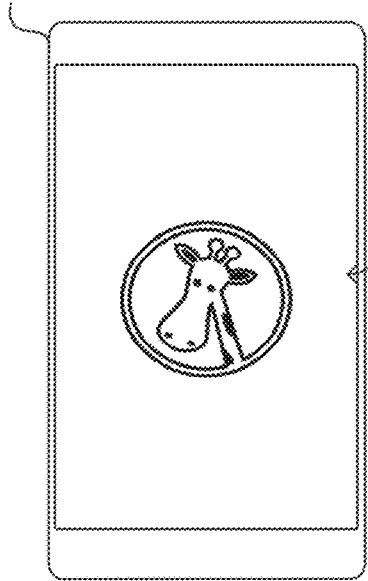
Figure 3D:
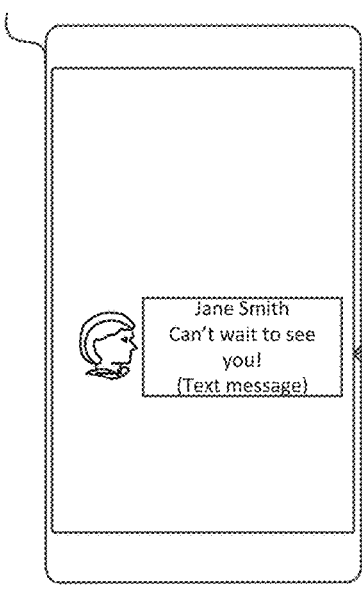

FIG. 3C illustrates a sender's client device 304, that has uploaded an image 308 to send to a receiver client device 304A in FIG. 3D. If the receiver is unintended, and is making a second or subsequent selection of the original URI, system 200 will determine that the original URI no longer exists, and will in turn return a random text message 308A consistent with a determination of a different current environmental state of the system.

Figure 3E:
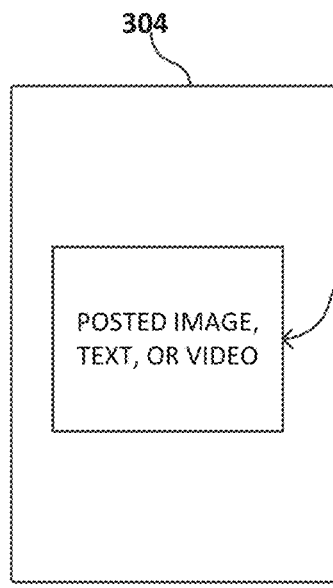
Figure 3F:

FIG. 3E illustrates a sender's client device 304, that has uploaded an image, text message, or video content 310 to send to a receiver client device 304A in FIG. 3F. If the receiver is unintended, and is making a second or subsequent selection of the original URI, system 200 will determine that the original URI no longer exists, and will in turn return a random advertisement 310A consistent with a determination of a different current environmental state of the system.

Figure 3G:
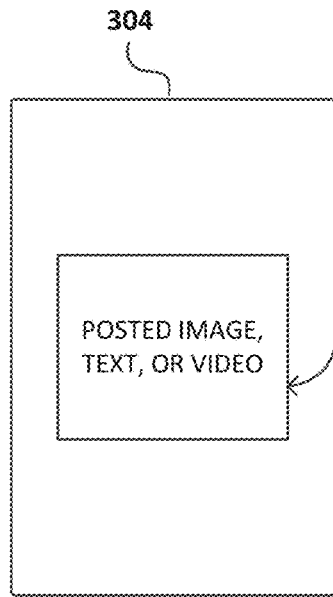
Figure 3H:
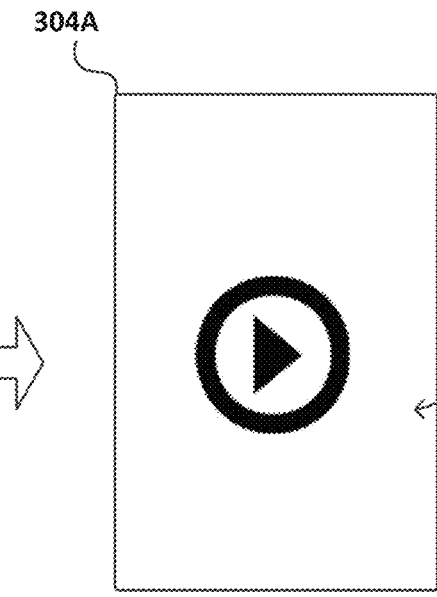

FIG. 3G illustrates a sender's client device 304 that has uploaded an image, text message, or video content 312 to send to a receiver client device 304A in FIG. 3H. If the receiver is unintended, and is making a second or subsequent selection of the original URI, system 200 will determine that the original URI no longer exists, and will in turn return a random video 312A consistent with a determination of a different current environmental state of the system.

FIG. 3J illustrates a sender's client device 304, that has uploaded an image, text message, or video content 316 to send to a receiver web browser 314 in FIG. 3I, or a receiver tablet computer 318 in FIG. 3K. If either of the receivers are unintended, and are making a second or subsequent selection of the original URI, system 200 will determine that the original URI no longer exists, and will in turn return a random string of text 316A in FIG. 3I or a low fidelity image 316A in FIG. 3K consistent with a determination of different current environmental states of the system.

Figure 4C:
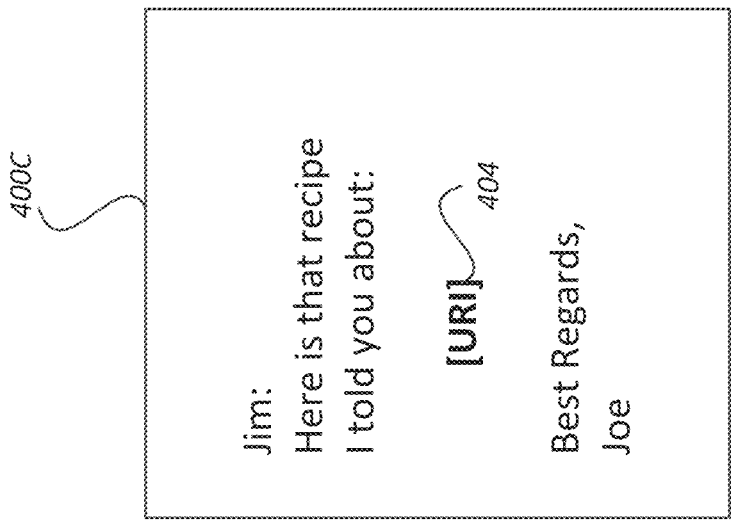
FIGS. 4A-4C illustrate a text encapsulation embodiment of the communication method of the present invention.
Figure 4B:
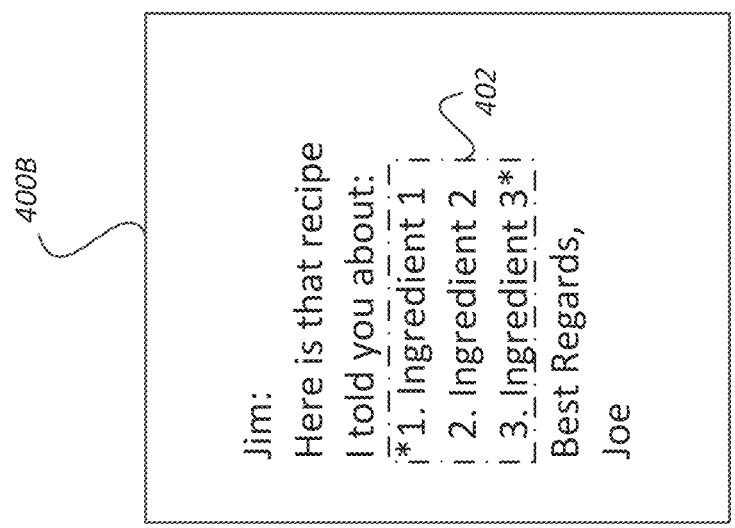
Figure 4A:
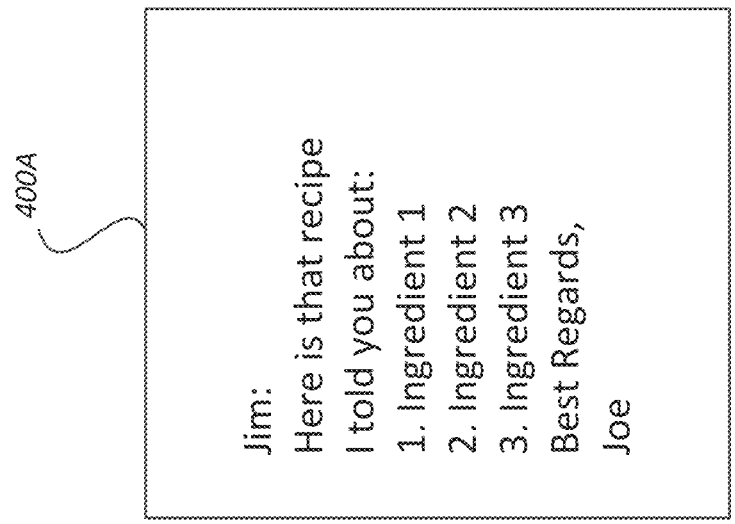

FIGS. 4A-4C illustrate an alternative text "encapsulation" embodiment of the communication method of the present invention. FIGS. 4A-4C can be used in any sort of messaging application including but not limited to email, mobile messaging, social media messaging, or creating documents through word processing, or sending messages or documents through a user interface coupled to a network. As shown in FIG. 4A, a user of the encapsulation method prepares a message or document 400A on, for example a cell phone or any of the other uploading mechanisms described herein. In FIG. 4B, the user highlights or otherwise emphasizes, marks, etc. text 402 that is desired to be encapsulated in document 400B and replaced with a URI, URL, or other such link. In accordance with various embodiments, other techniques can be used to select text to be replaced with a link as is known to those skilled in the art. These can include, for example, selecting desired text then selecting a graphical button to mark the text as desiring to be replaced with a link, selecting desired text then performing an action (e.g., right clicking the text, tap and holding the text, voice command, etc.) to bring up a menu of options and selecting the option to replace the text with a link, among other such options. While a dashed line highlighting is shown, any type of highlighting can be used to provide a visual indication to the user that the text will be replaced with a link. In addition, identifying marks such as an asterisk or other characters or strings of characters can demarcate text 402. These marks may not be visible to the user but, in accordance with various embodiments, may be readable by the messaging service and/or communication service of the present invention. Text 402 can represent sensitive portions or at least portions that a user desires to be kept secret of a message or other document where a desire exists to communicate portions securely.

When the message including the highlighted text is sent, the highlighted text is then either recognized by the messaging service used, or is sent through an interface, or otherwise communicated to the communication service of the present invention. Once the text 402 is recognized by the messaging service or communication service of the present invention, a URI or URL 404 is used to replace text 402 of document 400C as is shown in FIG. 4C. The URI can be generated automatically by the messaging service if the messaging includes the URI generator portion or other such portion of the communication method of the present invention. In another example, the highlighted portion of the message can be cropped or otherwise removed from the message and provided to the communication service. Upon receiving the message, the communication service can process the message in accordance with the embodiments described herein and provide a link to the message service. The message service can insert the link into the message. For example, the link can be inserted where the highlighted text would have been, amended at the end of the message, sent in a separate message, etc. In the situation where the link is appended at the end of the message or sent in another message, a graphical element can be placed in the position of the highlighted text. Alternatively, the URI can be generated by the communication service and returned to the user through a second email or directly through a user interface. Once the URI 404 replaces text 402, the message is ready for the user to share. Once the message with the replaced text is shared, a recipient of the message will see a message that is very similar to the one shown in FIG. 4C. Once the recipient selects the URI 404, the original text 402 will be sent either into the message being viewed, or through other means such as a second email or message, a pop-up message, an overlay that includes the message, etc. consistent with the teachings of the communication method of the present invention as set forth herein.

Figure 5A:
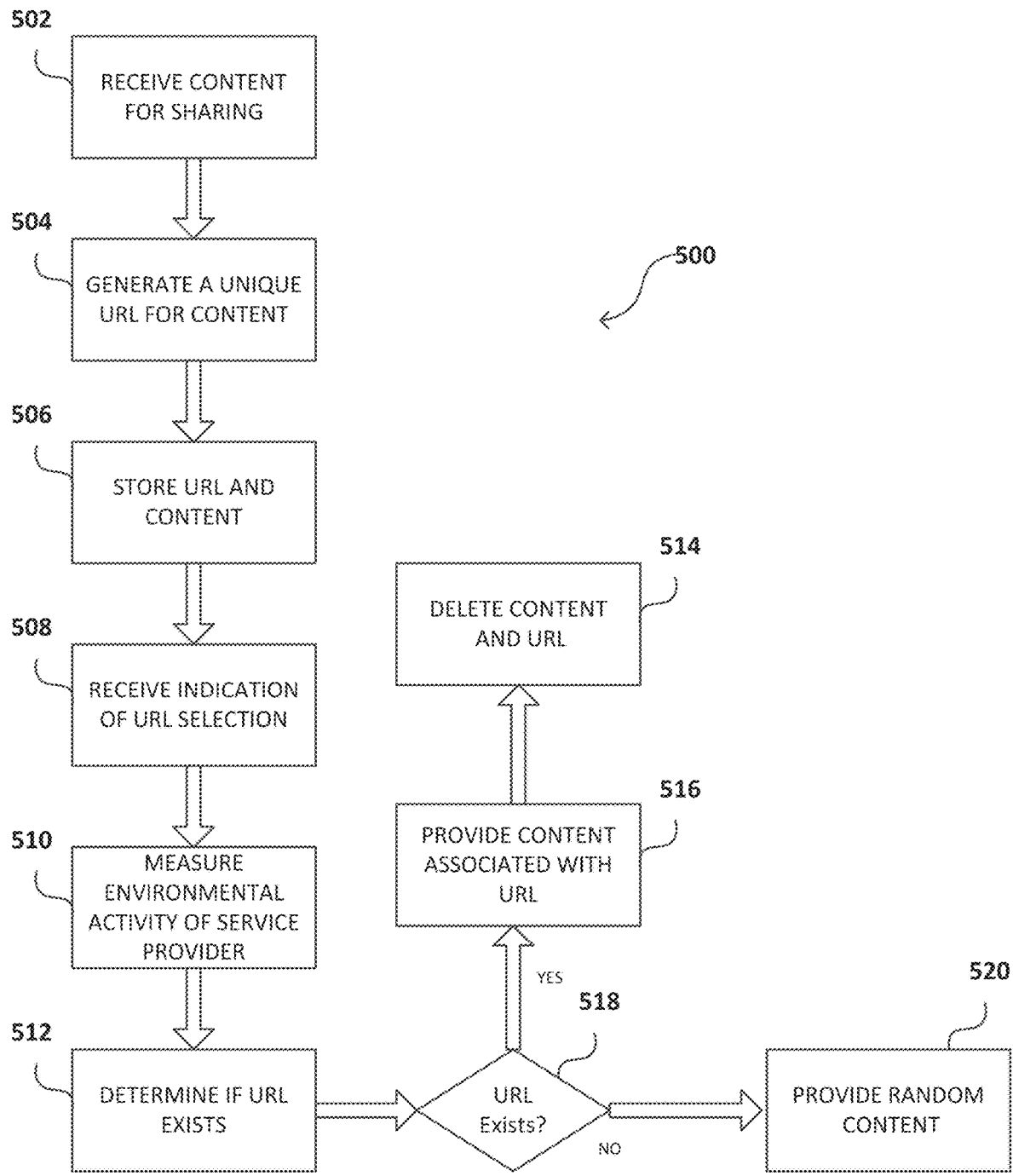
FIG. 5A illustrates a flow chart for an embodiment of the communication method of the present invention.
Figure 5B:
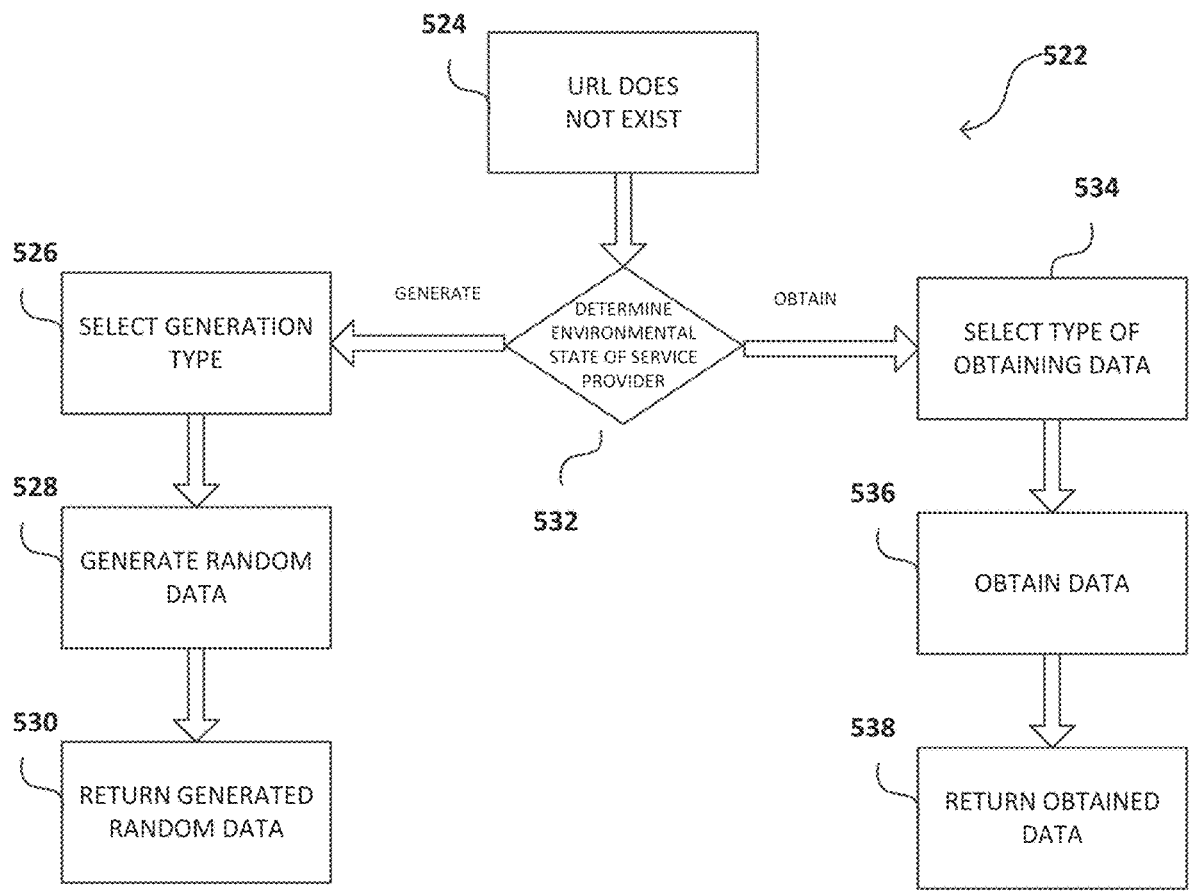
FIG. 5B illustrates a flow chart for a method of generating or obtaining data according to the communication method of the present invention.

FIGS. 5A and 5B illustrate flow charts pertinent to aspects of the communication method of the present invention. For example, FIG. 5A is a flow chart that covers, according to the present invention, uploading content, link generation, link sharing, and subsequent content viewing by the intended recipient. FIG. 5A also includes the sharing of random content with unintended recipients. FIG. 5B is a flow chart that covers aspects of how random content is generated or obtained according to the present invention. It should be understood that, for this and other processes discussed herein, there can be additional, fewer, or alternative steps, performed in similar or alternative steps, or in parallel, within the scope of the various embodiments unless otherwise stated.

FIG. 5A illustrates a flow chart 500 of a computer-implemented method according the present invention. At step 502, the system receives content for sharing from a client device at a service provider environment. At step 504, the system generates a unique cryptographically secure unique URI associated with the content. At step 506, the generated URI and user content are temporarily stored in a database, wherein a selection of the unique URI provides access to the content stored in the database. At step 508 the unique URI is provided to the intended receiver client device and an indication of a selection of the unique URI is received by the system. At step 510 the system measures the environmental activity of the service provider environment. Measuring environmental activity of the service provider environment includes determining a plurality of performance metrics associated with the service provider environment, and measuring a value of one or more of the plurality of performance metrics associated with the service provider environment. The plurality of performance metrics comprises obtaining at least two or more of the following metrics: a number of times that content is received, a number of times that content is shared, a number of active sessions, bandwidth usage of the service provider environment, IP addresses, memory usage of the service provider environment, processor cycles of the service provider environment, state of a running entropy model of the service provider environment, average file exposure time, and average time until content is viewed. At step 512, the system determines whether the unique URI exists in the database. Determining whether the unique URI exists in the database comprises querying a database index for the existence of the previously stored unique URI. At decision point 518, the system takes action with respect to whether or not the unique URI exists. If the URI does exist, then the intended receiver of the content is provided with the content associated with the URI at step 516. At step 514, the original content and URI are deleted. If the URI does not exist, then the unintended receiver of the content is provided with random content at step 520 based at least in part on the environmental activity of the service provider environment. The returned random content can be effectuated by using a random content generator technique to generate at least one of random text, a set of random images of gifs, a set of fake or dummy messages, or low fidelity responses. Returned content can also be effectuated by using a web crawler to search a plurality of content sources to obtain content or by accessing content via an application programming interface to obtain and store content for use in generating random content. It should be noted that step 512 can occur at any time after step 508. Step 510 is a consistent activity that measures real time usage statistics of the system of the present invention.

FIG. 5B illustrates a flow chart 522 for either generating new or obtaining pre-existing content. At step 524, the system determines that the original URI no longer exists in the database. At decision point 532, the system determines the current environmental state of the service provider. Depending upon the current environmental state, a decision is made to either generate the random data, or to obtain data. At step 526 the decision is made to generate random data, and to decide which type of random data is to be generated. At step 528 the specific type of random data is generated. For example, as discussed herein the specific type of random data that could be generated includes an algorithm for generating randomized text, image, audio or video, or an algorithm for generating a fake message. At step 530, the random data is returned. Conversely, at step 534 the decision is made to obtain the data, and to decide which specific type of data is to be obtained. For example, as discussed herein the specific type of data could be obtained by interacting with a free application programming interface or by crawling the World Wide Web to obtain an advertisement or other type of available information and content accessible through the World Wide Web. At step 536 the specific type of data is obtained. At step 538, the data is returned. It is important to note the distinction in the present invention between "obtaining" data and "generating" random data. While the gathered data (obtained data) may be returned in a manner that could be considered "random", the content itself is not necessarily random, but may have meaning and purpose such as an advertisement.

The method of the present invention as illustrated with respect to flow chart 522 assures that subsequent selections of a unique URI will, in some circumstances, return thematically similar content to content that has been recently deleted. For example, a first selection of a URI successfully finds content in the system database, which is returned. The URI is then removed from the database. On the next attempt to call the same URI, no record is found in the database and there is no content to be returned. According to the method of the present invention, while the URI no longer exists, the method of the present invention can determine that the URI was in fact recently used, and can then pull any stored metadata and contextual profiles to use for querying the index of the database to return thematically similar content or content derived from or dictated by the submitter of the initial content submission.

Figure 6A:
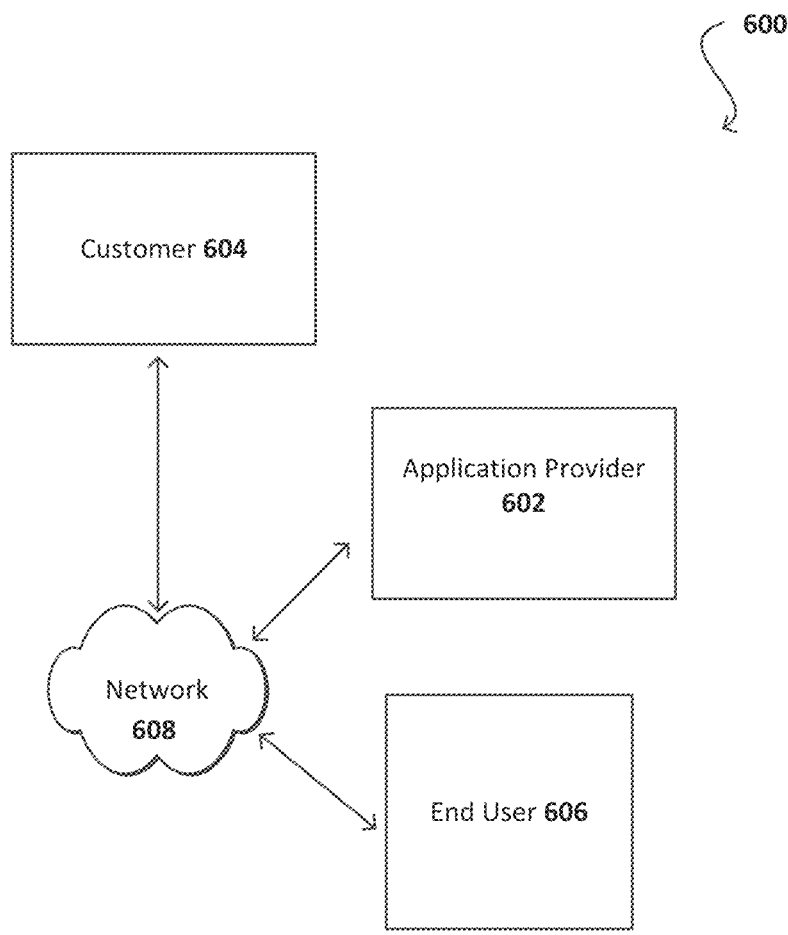
FIGS. 6A-6C illustrate an example network-based environment for enabling the communication method of the present invention.
Figure 6B:
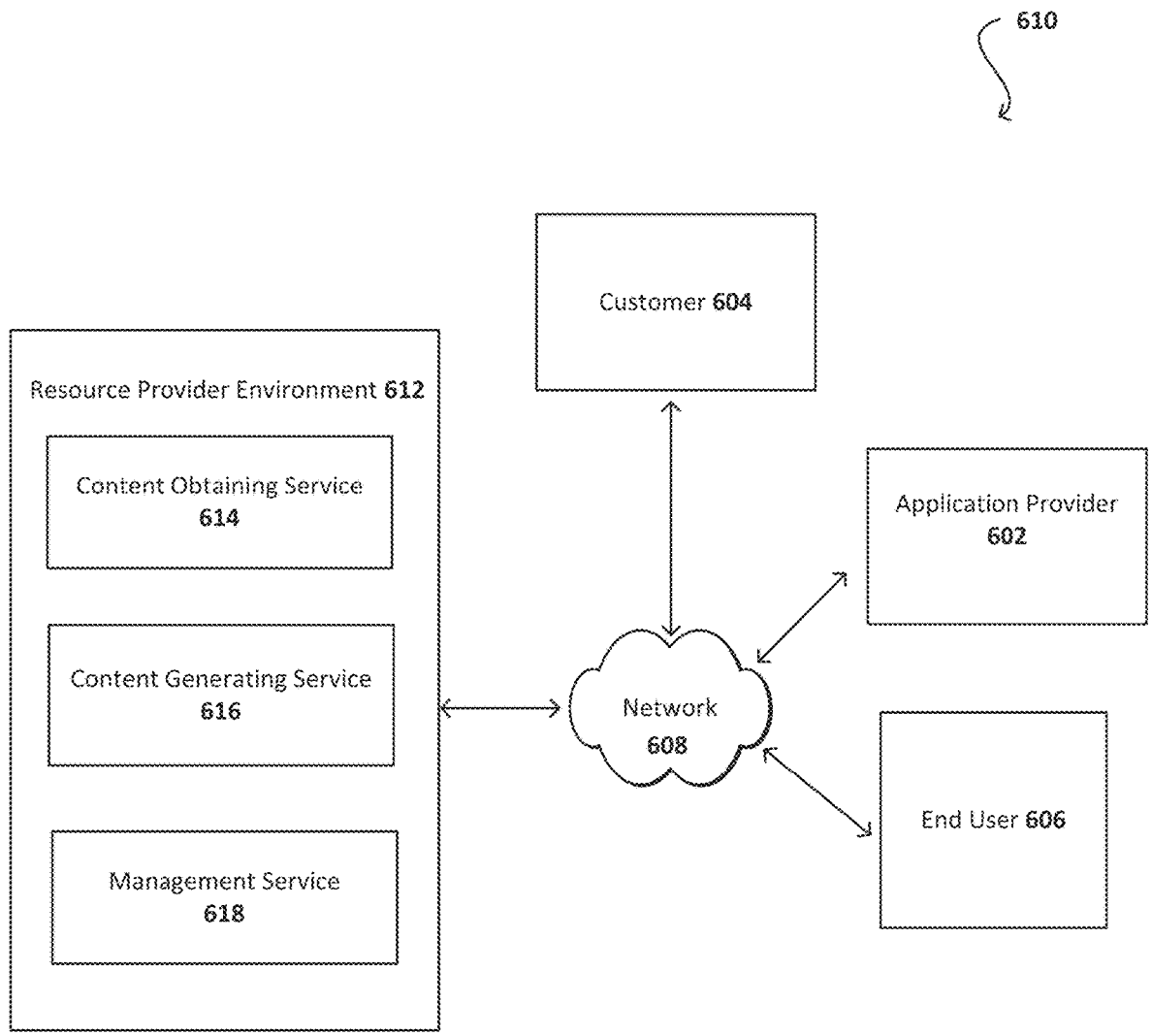
Figure 6C:
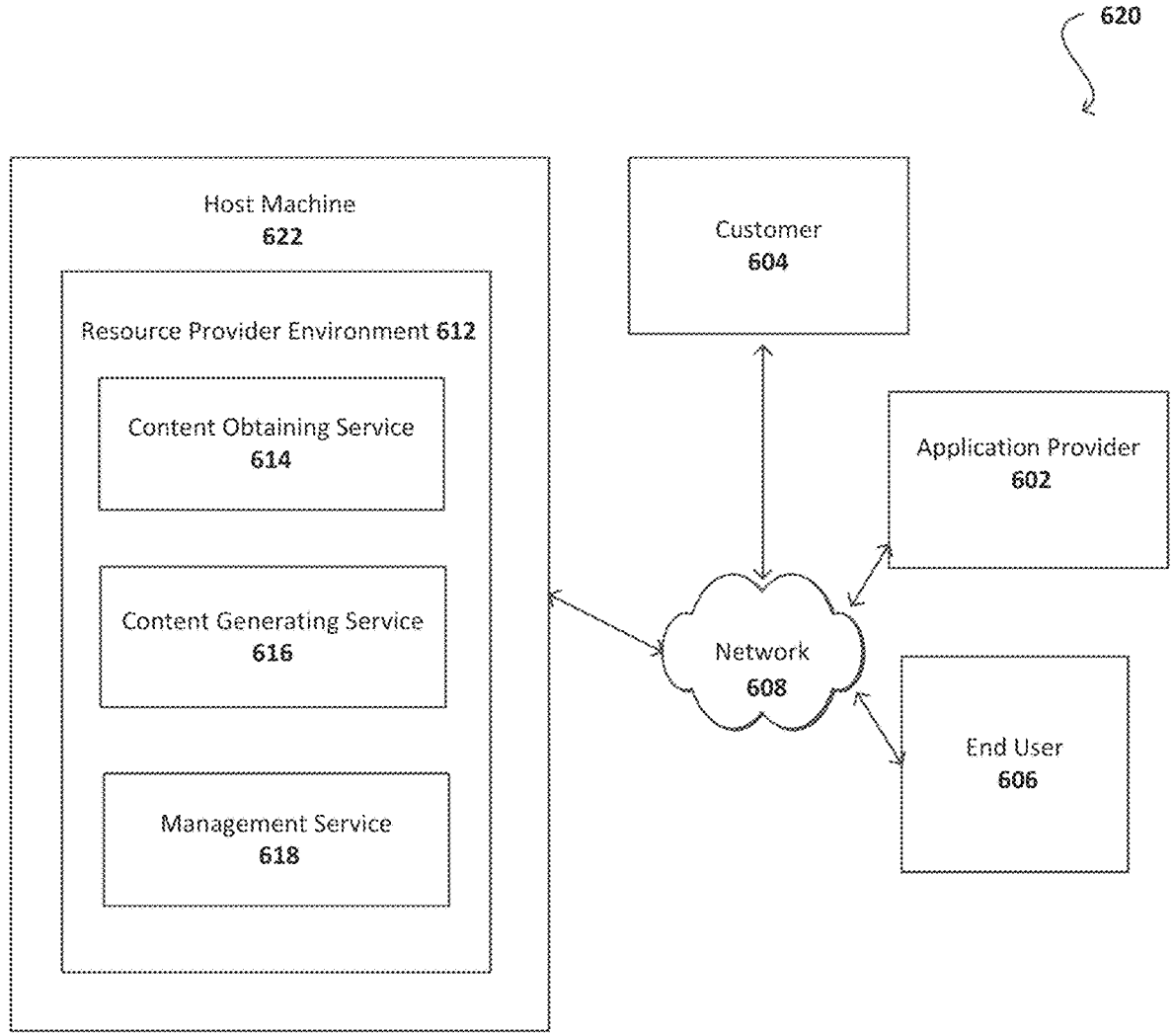

FIGS. 6A through 6C illustrate three different network-based service provider environment examples for carrying out the communication method of the present invention, although many other such configurations could be envisaged by those skilled in the art. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

FIG. 6A illustrates an example network-based service provider environment 600 for the system and method of the present communication method. In the example of FIG. 6A the communication method and system of the present invention is completely provided by the application provider 602 without the help of any third party services or components. The application provider 602 hosts all of the components and other features found in FIG. 2. The application provider 602 interacts with a customer 604 who can upload content and share a received link with an end user 606 through a network 608. FIG. 6A thus illustrates an application provider 602, that provides all of the system functions, and receives posts from a customer 604 through network 608, and returns content to an end user 606 through the same network 608.

FIG. 6B illustrates an alternative network-based example service provider environment 610 for the system and method of the present communication method. In the example of FIG. 6B many or all of the components and features found in FIG. 2 are provided by a third-party resource provider 612 through the network 608. Such an arrangement can be used for economic, performance, security, or other reasons. FIG. 6B thus illustrates the same application provider 602, customer 604, end user 606, and network 608, but wherein the actual system components are segregated out of the application provider 602 and are instead provided by a third-party resource provider environment 612. The resource provider environment 612 can include, in general terms, a content obtaining service 614, a content generating service 616, and a management service 618 that duplicates all of the storage and services shown in the system of FIG. 2 and described herein.

FIG. 6C illustrates yet another network-based alternative example service provider environment 620 wherein the resource provider environment 612 is provided in a host machine 622, resident in a governmental entity, university computing system, or the like. In the example of FIG. 6B, the host 622 machine is used to host all of the functions provided by the resource provider 612. The components and functions previously described in FIG. 2 can be shared between the resource provider 612 and the host machine 622, or they can all reside within the resource provider 612.

Figure 7:
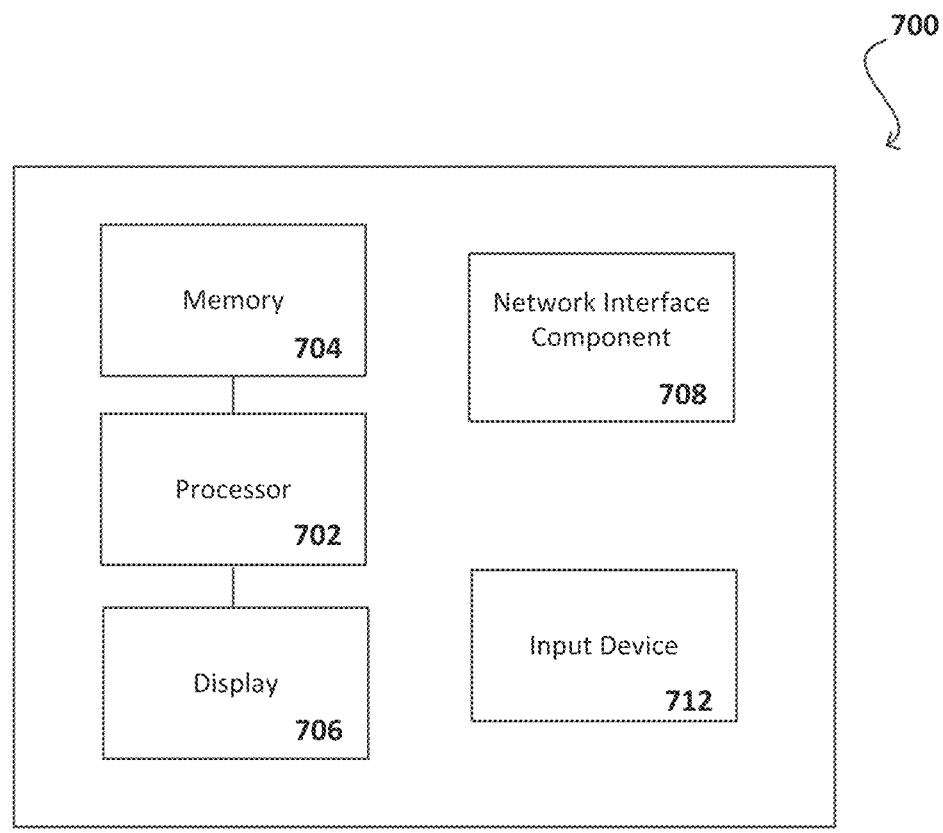
FIG. 7 illustrates a logical arrangement of a set of general components of an example computing device, in accordance with various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. The device can include one or more network interface components 708 configured to enable the device to transmit and receive information over a network. As discussed, the device in many embodiments will include at least one input element 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Examples of client devices described herein for use in posting or receiving content can include personal computers, cell phones, handheld messaging devices, laptop computers, set-top boxes, personal data assistants, electronic book readers and the like. The list of client devices is not exhaustive and other such devices are known to those skilled in the art for posting or receiving content.

The network such as network 608 described herein can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks an alternative device serving a similar purpose could be used, as would be apparent to one of ordinary skill in the art.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, JavaScript, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable medium including instructions that, when executed by at least one processor of a computer system, cause the computer system to:
   receive content to be stored in a database;
   generate a unique URI associated with the content;
   store the content and the associated URI in the database;
   measure an environmental activity of the database, wherein the environmental activity includes a plurality of performance metrics of the database;
   receive a first selection of the URI from a client device;
   determine that the URI exists in the database;
   return the content associated with the URI to the client device;
   delete the URI and the content associated with the URI from the database;
   receive a second selection of the URI;
   determine that the URI does not exist in the database; and
   increase the environmental activity of the database based at least in part on the measured level of environmental activity of the database.

2. The non-transitory computer-readable medium of claim 1, further comprising instructions to return random content that is thematically similar to recently deleted content upon determining that the URI has recently been selected.

3. The non-transitory computer-readable medium of claim 1, wherein the instructions to increase the environmental activity comprise instructions to return random content determined according to the environmental activity of the database.

4. The non-transitory computer-readable medium of claim 1, wherein the instructions to receive content comprise instructions to receive a plurality of content types.

5. The non-transitory computer-readable medium of claim 1, wherein the instructions to return content associated with the URI comprise instructions to return content via email, SMS text, or by copying to a clipboard.

6. The non-transitory computer-readable medium of claim 1, further comprising instructions to generate random content by randomization of text, generation of images or gifs, generation of fake or dummy messages, or generation of low fidelity responses.

7. The non-transitory computer-readable medium of claim 1, further comprising instructions to obtain random content by crawling the world wide web, or by obtaining access to free application programming interfaces, advertisements, or other sources of free information from a plurality of networks.

8. A method, comprising:
receiving content to be stored in a database;
generating a unique URI associated with the content;
storing the content and the associated URI in the database;
measuring an environmental activity of the database, wherein the environmental activity includes a plurality of performance metrics of the database;
receiving a first selection of the URI from a client device;
determining that the URI exists in the database;
returning the content associated with the URI to the client device;
deleting the URI and the content associated with the URI from the database;
receiving a second selection of the URI;
determining that the URI does not exist in the database; and
increasing the environmental activity of the database based at least in part on the measured level of environmental activity of the database.

9. The method of claim 8, further comprising:
returning random content that is thematically similar to recently deleted content upon determining that the URI has already been selected.

10. The method of claim 8, wherein increasing the environmental activity includes returning random content determined according to the environmental activity of the database.

11. The method of claim 8, wherein receiving content includes receiving a plurality of content types.

12. The method of claim 8, wherein returning content associated with the URI includes returning content via email, SMS text, or copying to a clipboard.

13. The method of claim 8, further comprising:
generating random content by randomization of text, generation of images or gifs, generation of fake or dummy messages, or generation of low fidelity responses.

14. The method of claim 8, further comprising:
obtaining random content by crawling the world wide web, or by obtaining access to free application programming interfaces, advertisements, or other sources of free information from a plurality of networks.

15. A computing device comprising:
at least one processor; and
memory including instructions that, when executed by the at least one processor, cause the computing device to:
store content and a URI associated with the content in a database;
measure an environmental activity of the database;
receive a first selection of the URI by a client device;
return the content associated with the URI to the client device;
delete the URI and the content associated with the URI from the database;
receive a second selection of the URI;
determine that the URI does not exist in the database; and
increase the environmental activity of the database based at least in part on a measured level of environmental activity of the database.

16. The computing device of claim 15, wherein the instructions when executed, further cause the computing device to obtain random content by crawling the world wide web, or by obtaining access to free application programming interfaces, advertisements, or other sources of free information from a plurality of networks.

17. The computing device of claim 15, wherein the instructions when executed, cause the computing device to return random content determined according to the environmental activity of the database.

18. The computing device of claim 15, wherein the instructions when executed, cause the computing device to receive a plurality of content types.

19. The computing device of claim 15, wherein the instructions when executed, cause the computing device to return content via email, SMS text, or by copying to a clipboard.

20. The computing device of claim 15, wherein the instructions when executed, further cause the computing device to generate random content by randomization of text, generation of images or gifs, generation of fake or dummy messages, or generation of low fidelity responses.

* * * * *